US011782947B2

(12) United States Patent
Shin et al.

(10) Patent No.: US 11,782,947 B2
(45) Date of Patent: Oct. 10, 2023

(54) APPARATUS FOR RECOMMENDING FEATURE AND METHOD FOR RECOMMENDING FEATURE USING THE SAME

(71) Applicant: SAMSUNG SDS CO., LTD., Seoul (KR)

(72) Inventors: Jaesun Shin, Seoul (KR); Ki Hyo Moon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 91 days.

(21) Appl. No.: 17/083,784

(22) Filed: Oct. 29, 2020

(65) Prior Publication Data

US 2021/0365470 A1    Nov. 25, 2021

(30) Foreign Application Priority Data

May 20, 2020  (KR) .................. 10-2020-0060251

(51) Int. Cl.
*G06F 16/2457*  (2019.01)
*G06N 20/00*  (2019.01)
*G06F 16/25*  (2019.01)

(52) U.S. Cl.
CPC ...... *G06F 16/258* (2019.01); *G06F 16/24578* (2019.01); *G06N 20/00* (2019.01)

(58) Field of Classification Search
CPC .. G06F 16/258; G06F 16/24578; G06N 20/00
See application file for complete search history.

(56) References Cited

U.S. PATENT DOCUMENTS

| 9,910,914 | B1 * | 3/2018 | Cowley | G06N 20/00 |
| 2009/0172730 | A1 * | 7/2009 | Schiff | G06Q 30/0273 |
| | | | | 725/34 |
| 2019/0013102 | A1 * | 1/2019 | Das | A61B 7/04 |
| 2019/0050446 | A1 * | 2/2019 | Gebremariam | G06F 16/258 |

FOREIGN PATENT DOCUMENTS

KR          10-0590538 B1       6/2006

OTHER PUBLICATIONS

Joris Van den Bossche, "Imputation of missing values". https://web.archive.org/web/20191215054638/https://scikit-learn.org/stable/modules/impute.html (Year: 2019).*

(Continued)

*Primary Examiner* — Mark D Featherstone
*Assistant Examiner* — Brooks T Hale
(74) *Attorney, Agent, or Firm* — The PL Law Group, PLLC

(57) ABSTRACT

A method and apparatus that recommends a feature from a data set. The method includes performing a first conversion on the data set including one target variable and a plurality of feature variables by converting a missing value for each of the feature variables into a preset constant, executing a first algorithm to determine a level of redundancy of the plurality of feature variables, using the data set converted by the first conversion and producing first recommendation information that includes a predetermined number of feature variables selected based on a result of the executing the first algorithm.

14 Claims, 10 Drawing Sheets

(56) References Cited

OTHER PUBLICATIONS

Adam C Pocock, "Feature Selection via Joint Likelihood", http://www.cs.man.ac.uk/~gbrown/publications/pocockPhDthesis.pdf, p. 111 (Year: 2012).*

Peter Tice, "Methods for Handling Missing Item Values in Regression Models Using the National Survey on Drug Use and Health (NSDUH)", https://www.samhsa.gov/data/sites/default/files/cbhsq-reports/NSDUH%20Methods%20for%20Handling%20Missing%20Item%20Values%202018.pdf, p. 23 (Year: 2018).*

* cited by examiner

FIG. 7

| No | Target | Var1 | Var2 | Var3 | Var4 | Var5 | Var6 | Var7 | Var8 | ... |
|---|---|---|---|---|---|---|---|---|---|---|
| 1 | 157.2266 | -0.3 | 0 | 83 | 0 | 0.9432 | 0 | 0 | 23 | |
| 2 | 148.4375 | -0.8 | 1 | null | 0 | 7.8112 | 0 | 2 | 14 | |
| 3 | 153.0762 | -1 | 1 | 84 | 1 | 2.5667 | 0 | 2 | null | |
| 4 | 165.2832 | -1.4 | 0 | 65 | 2 | 1.1898 | null | 2 | 22 | |
| 5 | 166.5039 | -1.7 | 0 | 73 | 1 | 6.4123 | 0 | 2 | 17 | |
| 6 | 173.0957 | -2 | null | 72 | null | null | 0 | 1 | 19 | |
| 7 | 142.5964 | 4.4 | 1 | 88 | null | 0.3223 | 0 | 2 | 20 | |
| 8 | 196.1554 | 1.6 | 1 | 60 | 1 | 4.1221 | 1 | 1 | 25 | |
| 9 | 148.9112 | -2.1 | 1 | 71 | 2 | 1.8932 | 0 | 1 | 17 | |
| 10 | 297.3537 | 1.8 | 1 | 79 | 2 | null | 0 | 0 | 31 | |
| 11 | 129.0491 | 3.3 | null | 81 | 1 | 1.1432 | 0 | null | 28 | |
| 12 | 187.4467 | 3.9 | 0 | 69 | null | 1.1651 | 0 | null | 28 | |
| 13 | 273.3167 | 4.6 | 1 | 66 | 0 | 0.6982 | 1 | 0 | 19 | |
| 14 | 198.6766 | 1.4 | 1 | 72 | null | 6.2234 | 1 | 1 | 23 | |
| 15 | 204.7101 | -0.7 | 1 | 60 | 0 | 1.6511 | 0 | 2 | 19 | |
| ... | | | | | | | | | | |

FIG. 8

| features variable | recommendation ranking | importance |
|---|---|---|
| Var5 | 1 | 0.3159 |
| Var3 | 2 | 0.09134 |
| Var14 | 3 | 0.09052 |
| Var11 | 4 | 0.06916 |
| Var2 | 5 | 0.04335 |
| Var1 | 6 | 0.02155 |
| Var9 | 7 | 0.02043 |
| Var12 | 8 | 0.01702 |
| Var6 | 9 | 0.01381 |
| Var8 | 10 | 0.00778 |
| Var4 | 11 | 0.00005 |
| Var7 | 12 | 0.00004 |
| Var16 | 13 | 0 |
| Var13 | 13 | 0 |
| Var20 | 15 | null |
| Var15 | 16 | null |
| ... | ... | ... |

FIG. 10

| | mse | rmse | r2 | mae |
|---|---|---|---|---|
| optimal model A (92) → 1010 | 2834.6684 | 53.2416 | 0.7937 | 42.3912 |
| optimal model B (93) → 1020 | 2245.3567 | 47.3851 | 0.8366 | 33.0274 |

…

APPARATUS FOR RECOMMENDING FEATURE AND METHOD FOR RECOMMENDING FEATURE USING THE SAME

CROSS-REFERENCE TO RELATED APPLICATIONS

This application claims the benefit of Korean Patent Application No. 10-2020-0060251, filed on May 20, 2020, in the Korean Intellectual Property Office, the disclosure of which is incorporated herein by reference in its entirety.

BACKGROUND

1. Field

The present inventive concept relates to an apparatus for recommending a feature and a method for recommending a feature thereof. More specifically, it relates to an apparatus for recommending a feature and a method for recommending a feature thereof, in which it extracts a feature from data having a missing value.

2. Description of the Related Art

A method for extracting a feature of data using statistical techniques and artificial intelligence algorithms is used to obtain meaningful information from data generated in various business environments. Here, data that is generated and stored in a real business environment has a number of missing values due to various factors such as input errors or no response.

These missing values may reduce the number of samples needed for data analysis, or cause incorrect analysis results. Therefore, a process for appropriate treatment is required depending on the characteristics and the occurrence frequency of the missing value.

Conventionally, in order to analyze data with a missing value, only data remaining after deleting the data was used. Alternatively, an imputation of missing value, which estimates and replaces the missing value by an appropriate value, has been mainly used.

However, when deleting all data having the missing value, there are disadvantages of not fully reflecting the feature of the original data and being sensitive to a result of correcting the missing value after feature extraction. In addition, in the case of the method for substituting the missing value with the estimated value, the feature is extracted without considering the ratio of missing values. Therefore, there is a problem in that accuracy of analysis is deteriorated.

Conventionally, a method for filtering duplicate features using statistical techniques such as correlation coefficient analysis and chi-square test, a method for finding an ideal combination of variables for a particular model based on the Greedy algorithm, or an embedded scheme for recommending a feature using built-in metrics has been used as a method for extracting a feature for data having a missing value.

However, in the case of these methods, feature extraction is possible only for data without missing values, which is limited in practical use. Also, they rely on an algorithm of one method for feature extraction. Therefore, there are drawbacks depending on the algorithm, such as poor accuracy, possibility of overfitting, or long learning time.

SUMMARY

Aspects of the inventive concept provide an apparatus for recommending a feature and a method for recommending a feature thereof, in which it may extract a feature associated with a target without removing a missing value for data having the missing value.

Aspects of the inventive concept also provide an apparatus for recommending a feature and a method for recommending a feature thereof, in which it may recommend a feature using various algorithms based on the amount of mutual information for data having a missing value.

Aspects of the inventive concept also provide an apparatus for recommending a feature and a method for recommending a feature thereof, in which it may provide feature recommendation information that is not sensitive to a result of correcting a missing value through the application of a penalty to the missing value.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to an aspect of the inventive concept, there is provided a method performed by an apparatus for recommending a feature. The method comprises performing, for a data set including one target variable and a plurality of feature variables, a first conversion to convert a missing value for each of the feature variables into a preset constant, executing at least one algorithm for filtering the feature variable having high redundancy among the plurality of feature variables using the data set changed by the first conversion, and providing a predetermined number of feature variables selected based on a result of executing the at least one algorithm as recommendation information.

According to another aspect of the inventive concept, there is provided a method, wherein executing the at least one algorithm comprises executing at least one of mRMR, JMIM, CMIM, and ICAP algorithms capable of measuring the amount of mutual information of the plurality of feature variables.

According to another aspect of the inventive concept, there is provided a method, wherein providing the predetermined number of feature variables as the recommendation information comprises giving a recommendation ranking for each of the feature variables by using an average of each recommendation ranking obtained by executing the at least one algorithm, and selecting the predetermined number of feature variables based on the recommendation ranking.

According to another aspect of the inventive concept, there is provided a method, further comprising performing a second conversion to convert a missing value for each of the predetermined number of feature variables provided as the recommendation information into a predetermined constant or a random value, executing an algorithm for extracting the feature variable having a high importance in relation to classification or prediction of the target variable among the predetermined number of feature variables using the data set changed by the second conversion, and providing final recommendation information based on a result of executing the algorithm.

According to another aspect of the inventive concept, there is provided a method, wherein performing the second conversion comprises converting the missing value for each of the predetermined number of feature variables into the predetermined constant in the case of a regression problem in which the target variable is a continuous variable.

According to another aspect of the inventive concept, there is provided a method, wherein performing the second conversion comprises converting the missing value for each of the predetermined number of feature variables into the random value in the case of a classification problem in which the target variable is a categorical variable.

According to another aspect of the inventive concept, there is provided a method, wherein executing the algorithm for extracting the feature variable having the high importance comprises executing a random forest algorithm capable of measuring relevancy with the target variable for the predetermined number of feature variables.

According to another aspect of the inventive concept, there is provided a method, wherein executing the algorithm for extracting the feature variable having the high importance comprises executing the algorithm using only a part of the predetermined number of feature variables based on a recommendation ranking given to each of the predetermined number of feature variables.

According to another aspect of the inventive concept, there is provided a method, wherein providing the final recommendation information comprises providing the feature variable whose importance level of each of the feature variables measured by executing the algorithm is greater than a preset threshold as the final recommendation information.

According to another aspect of the inventive concept, there is provided a method, further comprising performing first fit verification based on at least one machine learning algorithm using all of the plurality of feature variables, performing second fit verification based on the at least one machine learning algorithm using only the feature variables provided as the final recommendation information, and verifying the final recommendation information by comparing results of performing the first fit verification and the second fit verification.

According to an aspect of the inventive concept, there is provided an apparatus for recommending a feature. The apparatus comprises one or more processors, a communication interface for communicating with an external device, a memory for loading a computer program performed by the processor, and a storage for storing the computer program, wherein the computer program comprises instructions for performing an operation of performing, for a data set including one target variable and a plurality of feature variables, a first conversion to convert a missing value for each of the feature variables into a preset constant, an operation of executing at least one algorithm for filtering the feature variable having high redundancy among the plurality of feature variables using the data set changed by the first conversion, and an operation of providing a predetermined number of feature variables selected based on a result of executing the at least one algorithm as recommendation information.

According to another aspect of the inventive concept, there is provided an apparatus, wherein executing the at least one algorithm comprises an operation of executing at least one of mRMR, JMIM, CMIM, and ICAP algorithms capable of measuring the amount of mutual information of the plurality of feature variables.

According to another aspect of the inventive concept, there is provided an apparatus, wherein the providing the predetermined number of feature variables as the recommendation information comprises giving a recommendation ranking for each of the feature variables by using an average of each recommendation ranking obtained by executing the at least one algorithm, and the selecting the predetermined number of feature variables based on the recommendation ranking.

According to another aspect of the inventive concept, there is provided an apparatus, wherein the computer program further comprises instructions for performing, an operation of performing a second conversion to convert a missing value for each of the predetermined number of feature variables provided as the recommendation information into a predetermined constant or a random value, an operation of executing an algorithm for extracting the feature variable having a high importance in relation to classification or prediction of the target variable among the predetermined number of feature variables using the data set changed by the second conversion, and an operation of providing final recommendation information based on a result of executing the algorithm.

According to another aspect of the inventive concept, there is provided an apparatus, wherein the performing the second conversion comprises an operation of converting the missing value for each of the predetermined number of feature variables into the predetermined constant in the case of a regression problem in which the target variable is a continuous variable.

According to another aspect of the inventive concept, there is provided an apparatus, wherein the performing the second conversion comprises an operation of converting the missing value for each of the predetermined number of feature variables into the random value in the case of a classification problem in which the target variable is a categorical variable.

According to another aspect of the inventive concept, there is provided an apparatus, wherein the executing the algorithm for extracting the feature variable having the high importance comprises an operation of executing a random forest algorithm capable of measuring relevancy with the target variable for the predetermined number of feature variables.

According to another aspect of the inventive concept, there is provided an apparatus, wherein the executing the algorithm for extracting the feature variable having the high importance comprises an operation of executing the algorithm using only a part of the predetermined number of feature variables based on a recommendation ranking given to each of the predetermined number of feature variables.

According to another aspect of the inventive concept, there is provided an apparatus, wherein the providing the final recommendation information comprises an operation of providing the feature variable whose importance level of each of the feature variables measured by executing the algorithm is greater than a preset threshold as the final recommendation information.

According to another aspect of the inventive concept, there is provided an apparatus, further comprising an operation of performing first fit verification based on at least one machine learning algorithm using all of the plurality of feature variables, an operation of performing second fit verification based on the at least one machine learning algorithm using only the feature variables provided as the final recommendation information, and an operation of verifying the final recommendation information by comparing results of performing the first fit verification and the second fit verification.

BRIEF DESCRIPTION OF THE DRAWINGS

These and/or other aspects will become apparent and more readily appreciated from the following description of the embodiments, taken in conjunction with the accompanying drawings in which:

FIG. 7 shows an example of data having a missing value according to some embodiments of the present invention;

FIG. 8 is an example of a result of feature recommendation for the data having the missing value according to some embodiments of the present invention; and FIGS. 9 and 10 are examples of verifying the result of feature recommendation according to some embodiments of the present invention.

DETAILED DESCRIPTION

Figure 1:
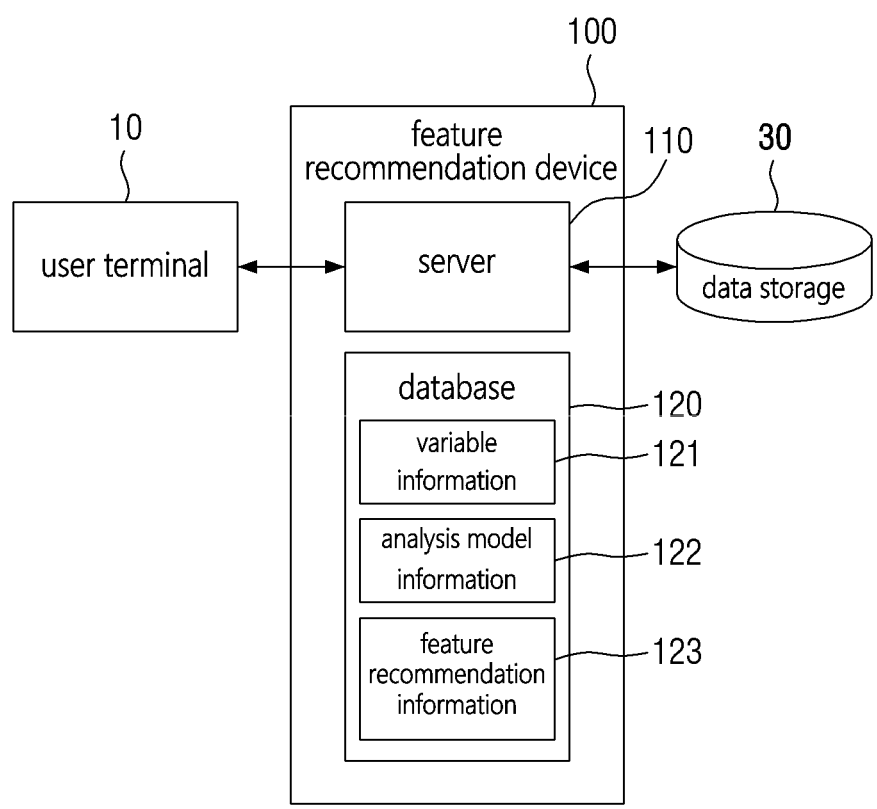
FIG. 1 is a block diagram showing the configuration of an apparatus for recommending a feature according to an embodiment of the present invention.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will hilly convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

FIG. 1 is a block diagram showing the configuration of an apparatus for recommending a feature according to an embodiment of the present invention. Referring to FIG. 1, according to an embodiment of the present invention, an apparatus for recommending a feature 100 includes a server 110 and a database 120. Feature 100 processes a request for feature recommendation received from a user terminal 10, and provides a result.

The server 110 is a fixed computing device, and is connected to the user terminal 10 and to a data storage 30 via a network. The server 110 performs analysis for feature recommendation using data stored in the data storage 30 in response to a request for feature recommendation received from the user terminal 10. The server 110 may be implemented as a device dedicated to machine learning capable of executing statistical analysis and artificial intelligence algorithms.

The data storage 30 may be implemented as a separate external device or a DB (i.e. database) server connected to the apparatus 100 for recommending the feature via a network, and may store data generated in a business environment in various fields.

Here, the data stored in the data storage 30 may include a data set including at least one continuous variable and a categorical variable. Here, each of the continuous variable and the categorical variable may be used as a target variable or a feature variable when analyzing data for feature recommendation.

Further, the data stored in the data storage 30 may include a missing value caused by various factors such as an input error or no response.

The server 110 may receive data from the data storage 30 in units of a predetermined cycle, or may request required data from the data storage 30 whenever a request is generated by user terminal 10.

The server 110 may perform analysis for feature recommendation using the data transmitted from the data storage 30 and provide a result of analysis to the user terminal 10.

The database 120 stores variable information 121 related to the continuous variable and the categorical variable constituting the data received from the data storage 30 by the server 110. In addition, the database 120 stores information 122 on an analysis model that the server 110 generates to recommend a feature for the data received from the data storage 30, and feature recommendation information 123 provided based on a result of learning the analysis model.

The database 120 may be implemented as a DB server that stores all information related to data analysis for feature recommendation processed by the apparatus 100 for recommending the feature.

The user terminal 10 may be any of a fixed computing device such as a personal desktop PC, or a mobile computing device such as a smart phone, a tablet PC, a laptop PC, a PDA, a virtual reality (VR) imaging device, or an augmented reality (AR) imaging device. The user terminal 10 may be implemented as a terminal of an administrator or employee that requests feature recommendation for the data stored in the data storage 30 to the server 110 of the apparatus 100 for recommending the feature, and makes a decision using a result of feature recommendation result provided by server 110.

By the configuration of the apparatus 100 for recommending the feature according to the embodiment of the present invention as described above, it is possible to provide an optimal method of extracting a feature associated with a target without removing a missing value for data having the missing value.

Figure 2:
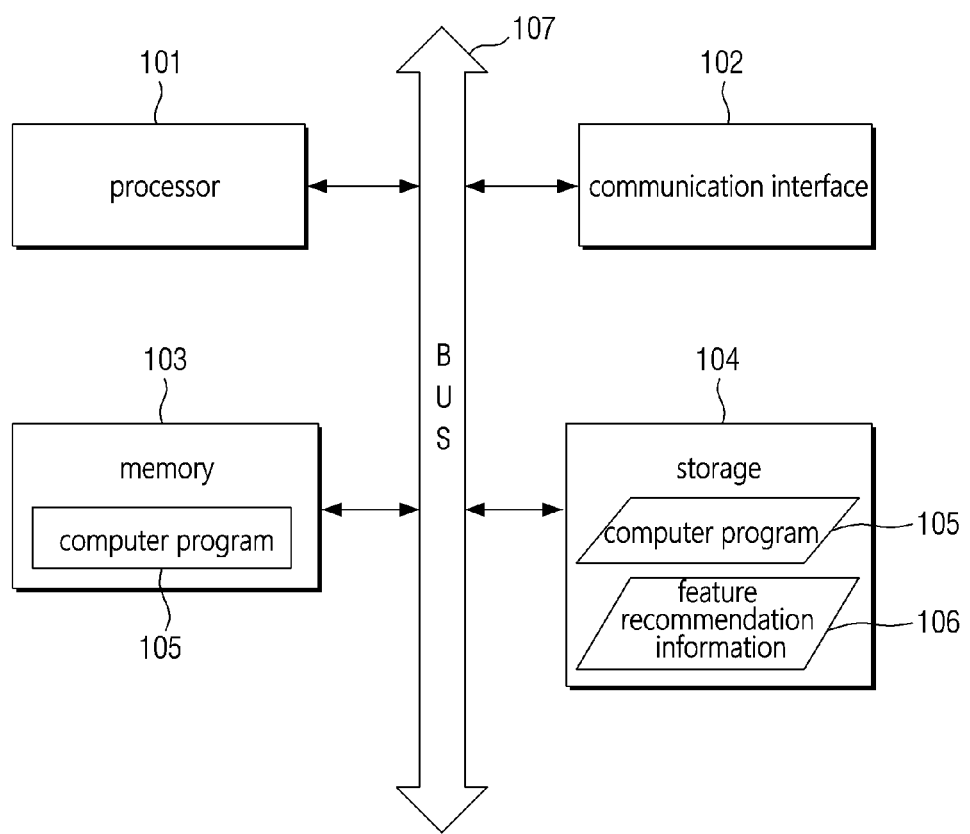
FIG. 2 is a configuration diagram showing the hardware configuration of the apparatus for recommending the feature described with reference to FIG. 1.

FIG. 2 is a configuration diagram showing the hardware configuration of server 110 of apparatus 100 for recommending the feature described with reference to FIG. 1.

Referring to FIG. 2, the server 110 of the apparatus 100 for recommending a feature is a computing device and the apparatus 100 may include one or more processors 101, a bus 107, a communication interface 102, a memory 103, which loads a computer program 105 executed by the processors 101, and a storage 104 for storing the computer program 105 along with subsequent feature recommendation information 106. However, FIG. 2 illustrates only the components related to the embodiment of the present disclosure. Therefore, it will be appreciated by those skilled in the art that apparatus 100 and server 110 may also include other general purpose components in addition to the components shown in FIG. 2.

The processor 101 controls overall operations of each component of the server 110 of the apparatus 100. The processor 101 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 101 may perform calculations on at least one application or program 105 for executing a method/operation according to various embodiments of the present disclosure. Server 110 of the apparatus 100 may have one or more processors 101.

The memory 103 stores various data, instructions and/or information. The memory 103 may load one or more programs 105 from the storage 104 to execute methods/operations according to various embodiments of the present disclosure. For example, when the computer program 105 is loaded into the memory 103, the logic (or the module) may be implemented on the memory 103. An example of the memory 103 may be a RAM, but is not limited thereto.

The bus 107 provides communication between components of the server 110 of the apparatus 100. The bus 107 may be implemented as various types of bus such as an address bus, a data bus and a control bus.

The communication interface 102 supports wired and wireless Internet communications to and from server 110 of the apparatus 100. The communication interface 102 may instead or also support various communication methods other than Internet communication. To this end, the communication interface 102 may be configured to comprise a communication module well known in the art of the present disclosure.

The storage 104 can non-temporarily (i.e. non-erasable upon power interruption) store one or more computer programs 105. The storage 104 may be configured to comprise a non-volatile memory, such as a Read. Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, on which the methods/operations according to various embodiments of the present disclosure are implemented. When the computer program 105 is loaded into memory 103, the processor 101 may perform the methods/operations in accordance with various embodiments of the present disclosure by executing the one or more instructions.

For example, the computer program 105 may include instructions to perform an operation of performing, for a data set including one target variable and a plurality of feature variables, a first conversion that converts a missing value for each of the feature variables into a preset constant, an operation of executing at least one algorithm for the filtering feature variable having high redundancy among the plurality of feature variables using the data set changed by the first conversion, and an operation of providing a predetermined number of feature variables selected based on a result of executing the at least one algorithm as recommendation information.

As an embodiment, the executing the at least one algorithm may include an operation of executing at least one of mRMR (i.e., Minimum Redundancy Maximum Relevance), JMIM (i.e. Joint Mutual Information Maximization), CMIM (i.e. Conditional Mutual Information Maximization), and ICAP (i.e., Interaction Capping) algorithms capable of measuring the amount of mutual information of the plurality of feature variables.

As an embodiment, the providing the predetermined number of feature variables as the recommendation information may include an operation of giving a recommendation ranking for each of the feature variables by using an average of each recommendation ranking obtained by executing the at least one algorithm, and an operation of selecting the predetermined number of feature variables based on the recommendation ranking.

As an embodiment, the computer program 105 may further include instructions to perform an operation of performing a second conversion that converts the missing value for each of the predetermined number of feature variables provided as the recommendation information into a predetermined constant or a random value, an operation of executing an algorithm for extracting the feature variable having a high importance in relation to classification or prediction of the target variable among the predetermined number of feature variables using the data set changed by the second conversion, and an operation of providing final recommendation information based on a result of executing the algorithm.

As an embodiment, the performing the second conversion may include an operation of converting the missing value for each of the predetermined number of feature variables into the predetermined constant in the case of a regression problem in which the target variable is a continuous variable. In addition, the performing the second conversion may include an operation of converting the missing value for each of the predetermined number of feature variables into the random value in the case of a classification problem in which the target variable is a categorical variable.

As an embodiment, the executing the algorithm for extracting the feature variable having the high importance may include an operation of executing a random forest algorithm capable of measuring relevancy with the target variable for the predetermined number of feature variables. Here, the executing the algorithm for extracting the feature variable having the high importance may include an operation of executing the algorithm using only a part of the predetermined number of feature variables based on the recommendation ranking given to each of the predetermined number of feature variables.

As an embodiment, the providing the final recommendation information may include an operation of providing the feature variable whose importance level of each of the feature variables measured by executing the algorithm is greater than a preset threshold as the final recommendation information.

As described above, according to the feature recommendation apparatus 100 according to the embodiment of the present invention, it is possible to extract appropriate features associated with a target without removing a missing value for data having the missing value. In addition, it is possible to provide feature recommendation information that is not sensitive to a result of correcting a missing value by applying a penalty for the missing value.

Figure 3:
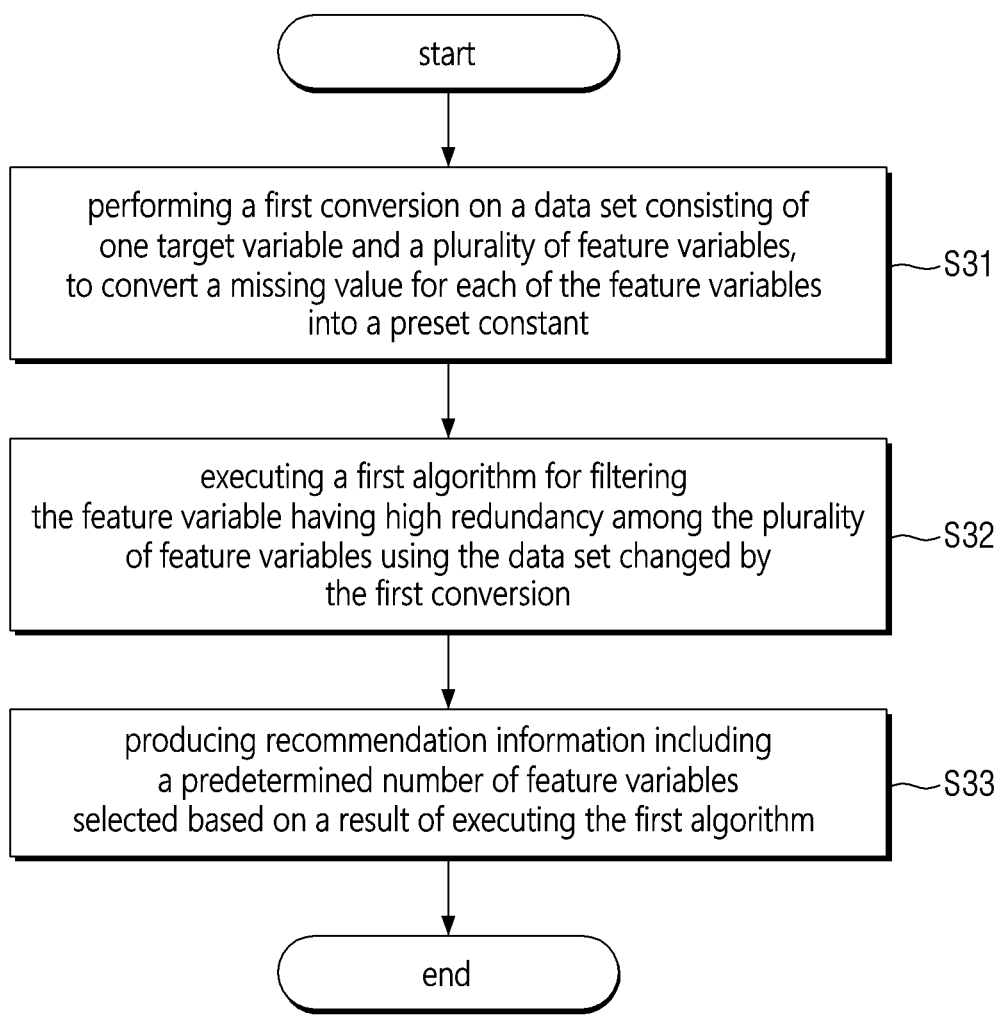
FIG. 3 is a flowchart illustrating a method for recommending a feature according to an embodiment of the present invention.

FIG. 3 is a flowchart illustrating a method for recommending a feature according to an embodiment of the present invention. The method for recommending the feature according to the present embodiment may be executed by a computing device, for example, by the apparatus 100 for recommending the feature.

The computing device executing the method according to the present embodiment may be a computing device having a program development environment or a computing device having an application program execution environment. It is noted that a description of a subject performing some operations included in the method according to the present embodiment may be omitted, and in such a case, the subject is the computing device.

Referring to FIG. 3, first, in operation S31, a first conversion is performed by converting a missing value for each feature variable into a preset constant on a data set that includes one target variable and a plurality of feature variables.

Here, the data set includes data that the server 110 of the feature recommendation apparatus 100 described in FIG. 1 receives from the data storage 30 upon the request by the user terminal 10. The data set may include the one target variable and the plurality of feature variables for analyzing the association with the one target variable. The plurality of feature variables may include synthetic variables created by processing variables included in original data. In the data set, the designation of the target variable and the plurality of feature variables may be set differently by a user of the user terminal 10 depending on the purpose of analysis.

As an embodiment, the target variable and the plurality of feature variables may be provided as a continuous variable or a categorical variable. In the case of the categorical variable, a binary variable having a value of 0 or 1 or a multiclass variable divided into a plurality of values is possible.

In operation S31, a redundancy penalty may be applied to the feature having the missing value through a first conversion, which is a scheme of filling the missing value with a constant. In other words, by increasing the redundancy between the feature variables having many missing values, it is possible to reduce the possibility that the variables having many missing values are selected as a recommended feature in subsequent filtering.

Next, in operation S32, a first algorithm is executed to filter the feature variable having high redundancy among the plurality of feature variables using the data set changed by the first conversion.

As an embodiment, operation S32 may include executing at least one of mRMR, JMIM, CMIM, and ICAP algorithms capable of measuring mutual information of the plurality of feature variables. Here, the amount of mutual information means the amount of information indicating how two random variables are related to each other. If the two random variables are completely independent, the value becomes 0. If the two random variables are closely related to each other, the value increases, if they are related in the reverse direction, the value becomes small. In other words, it is possible to quantify and determine how closely the two random variables are related by using the amount of mutual information.

In other words, in operation S32, by executing the first algorithm which could include one or more algorithms, the amount of mutual information between the plurality of feature variables is measured, and the variables having a large amount of mutual information are determined as the variables having high redundancy, so that they may be filtered when recommending the feature variable.

In operation S32, the following method is applied to each algorithm capable of measuring the amount of mutual information. In the case of the minimum redundancy-maximum relevancy criterion (mRMR) algorithm, it selects a feature in a way that reduces redundant information among selected features with high relevancy to a target variable. In the case of the joint mutual information maximization criterion (JMIM) algorithm, a feature is selected by maximizing joint mutual information between candidate features and pre-selected features. In the case of the conditional mutual information maximization (CMIM) algorithm, a feature is selected based on conditional mutual information, but avoids features similar to pre-selected features. In the case of the ICAP algorithm, when the interaction between candidate features and pre-selected features overlaps, a penalty is applied to select features having a high amount of mutual information with a target and a low amount of mutual information with the preselected features.

Next, in operation S33, recommendation information is produced, the recommendation information includes a predetermined number of feature variables selected based on the result of executing the first algorithm. As an embodiment, operation S33 may include an operation of giving a recommendation ranking for each of the feature variables by using an average of recommendation rankings for each algorithm obtained by executing the first algorithm in operation S32, and an operation of selecting the predetermined number of feature variables based on the recommendation ranking.

In other words, when the recommendation ranking for each of the plurality of feature variables are provided by executing the first algorithm, an average of recommendation rankings for each of the feature variables provided for each algorithm included in the first algorithm may be calculated. Here, a final recommendation ranking for each of the feature variables is given using the calculated average of the recommendation rankings of each of the feature variables, and based on this, the predetermined number of feature variables having a high final recommendation ranking may be selected as the recommended feature.

According to the embodiment as described above, by applying a penalty in a manner to maximize redundancy between features with missing values and filtering features with high redundancy using various algorithms based on the amount of mutual information, more accurate results of feature recommendation may be provided.

Figure 4:
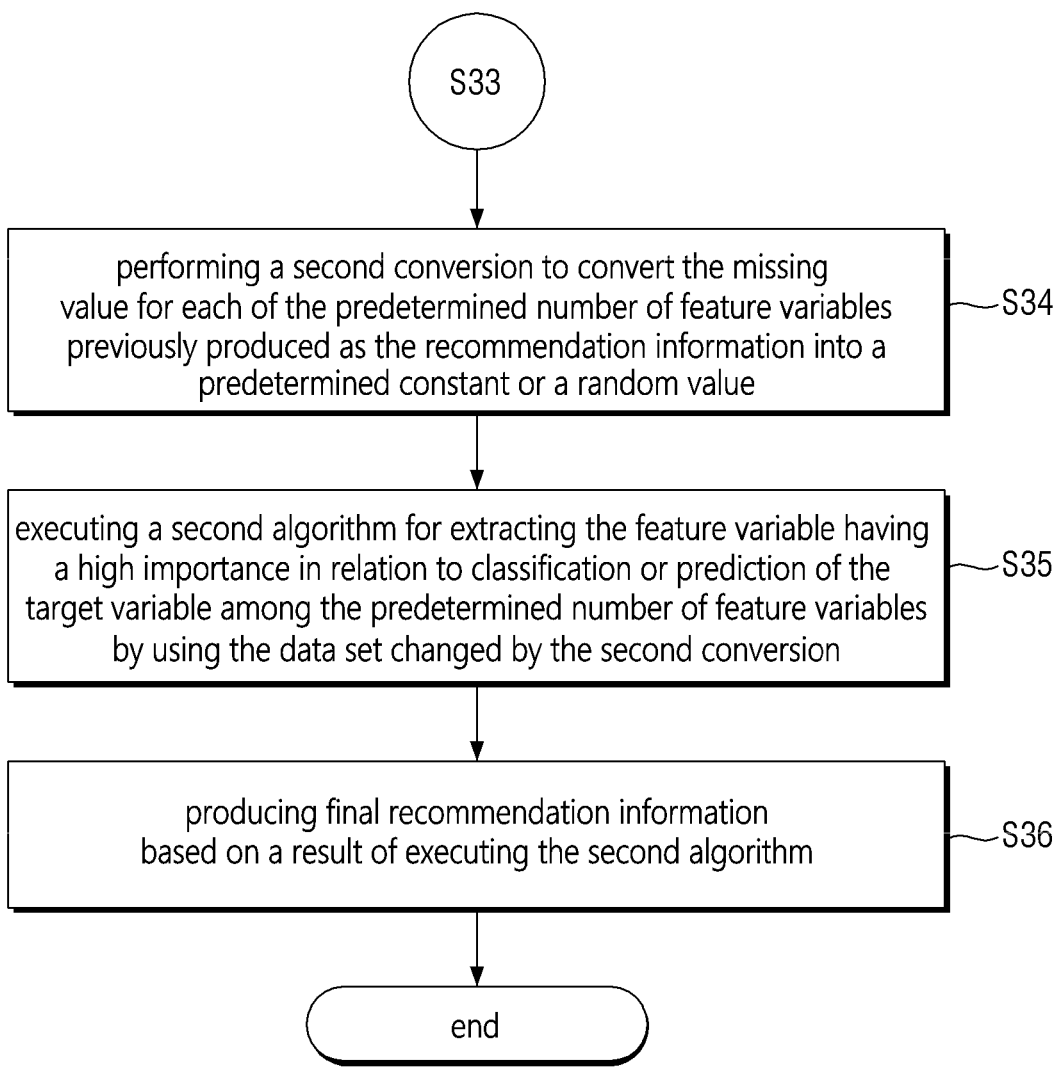
FIG. 4 is a flowchart illustrating a method for recommending a feature according to another embodiment of the present invention.

FIG. 4 is a flowchart illustrating a method for recommending a feature according to another embodiment of the present invention. The method for recommending the feature according to the present embodiment may be executed by a computing device, for example, by the apparatus 100 for recommending the feature.

The computing device executing the method according to the present embodiment may be a computing device having a program development environment or a computing device having an application program execution environment. It is noted that a description of a subject performing some operations included in the method according to the present embodiment may be omitted, and in such a case, the subject is the computing device.

In FIG. 4, an embodiment in which a relevancy penalty is additionally applied after applying the redundancy penalty to the feature having the missing value in FIG. 3 will be described.

Referring to FIG. 4, in operation S34, a second conversion is performed to convert the missing value for each of the predetermined number of feature variables produced as the recommendation information according to the result of performing operation S33 into a predetermined constant or a random value.

As an embodiment, operation S34 may include an operation of converting the missing value for each of the predetermined number of feature variables into the predetermined constant in the case of a regression problem in which the target variable is a continuous variable. In addition, operation S34 may include an operation of converting the missing value for each of the predetermined number of feature variables into the random value in the case of a classification problem in which the target variable is a categorical variable.

As described above, in operation S34, a relevancy penalty may be applied to the feature having the missing value through the second conversion, which is a scheme of filling the missing value with the constant or the random value. In other words, it is possible to obtain the benefit of lowering the importance of the feature variable by lowering the relevancy between the feature variable having many missing values and the target variable. Accordingly, it is possible to minimize the relevancy to the target for the variable having many missing values, and to reduce the possibility that it is selected as the final recommended feature.

Next, in operation S35, using the data set changed by the second conversion, a second algorithm is executed to extract the feature variable having a high importance in relation to classification or prediction of the target variable among the predetermined number of feature variables provided as the recommendation information according to the application of the redundancy penalty by the first conversion.

As an embodiment, operation S35 may include an operation of executing a random forest algorithm capable of measuring relevancy with the target variable for the predetermined number of feature variables. In addition, the second algorithm used when performing operation S35 is not limited to the random forest. The relevancy of the feature variable and the target variable may be measured using various machine learning techniques such as support vector machine (SVM), bagging ensemble, voting ensemble, gradient boosting, logistic regression, etc.

The random forest algorithm is a kind of ensemble learning model used for detection, classification, and regression analysis, and works by outputting classification or average predictions from multiple decision trees constructed during training. In order to overcome the shortcomings of the decision tree, the random forest uses a combined method for randomized node optimization (RNO) and bootstrap aggregating (bagging) to construct the forest with uncorrelated trees. As a result, it may improve the generalization performance. In addition, the random forest has a low possibility of overfitting and is good in terms of generalization. Further, it is a very useful method in the feature recommendation process by providing an importance for each feature variable that is easy to interpret.

As an embodiment, operation S35 may include an operation of executing second algorithm using only a part of the predetermined number of feature variables based on the recommendation ranking given to each of the predetermined number of feature variables. For example, when running the random forest algorithm, not all of the predetermined number of feature variables provided as the recommendation information according to the application of the redundancy penalty by the first conversion is used. After applying the relevancy penalty by the second conversion to only K feature variables corresponding to some of the predetermined number of feature variables in comparison with a preset value, it may be used as input data of the random forest.

Finally, in operation S36, final recommendation information is produced based on the result of executing the second algorithm performed in operation S35. Here, operation S36 may include selecting feature variables whose importance level of each of the feature variables measured by executing the second algorithm is greater than a preset threshold as the final recommendation information. For example, only the feature variable having an importance value greater than 0.0001 of each feature variable calculated through a result of learning the random forest may be selected as a final recommended variable.

As an embodiment, an operation of verifying whether the feature variables included in the final recommendation information provided according to the performance of operation S36 is an optimal combination of variables that may describe the target variable may be additionally performed.

As an embodiment, an operation of performing first fit verification based on at least one machine learning algorithm using all of the plurality of feature variables, an operation of performing second fit verification based on at least one machine learning algorithm using only the feature variables provided as the final recommendation information, and an operation of verifying the final recommendation information by comparing results of performing the first fit verification and the second fit verification may be performed as the verifying operation. Here, for the first fit verification and the second fit verification, for example, indicators such as mean squared error (MSE), root mean squared error (RMSE), mean absolute error (MAE), or $R^2$ may be used.

According to the embodiment as described, the optimal combination of feature variables may be provided as recommendation information by applying a penalty in a manner that maximizes redundancy between features and minimizes relevancy to a target variable, for features having missing values, and by using a filtering scheme based on the amount of mutual information and an embedded scheme to measure the relevancy to the target variable.

Figure 5:
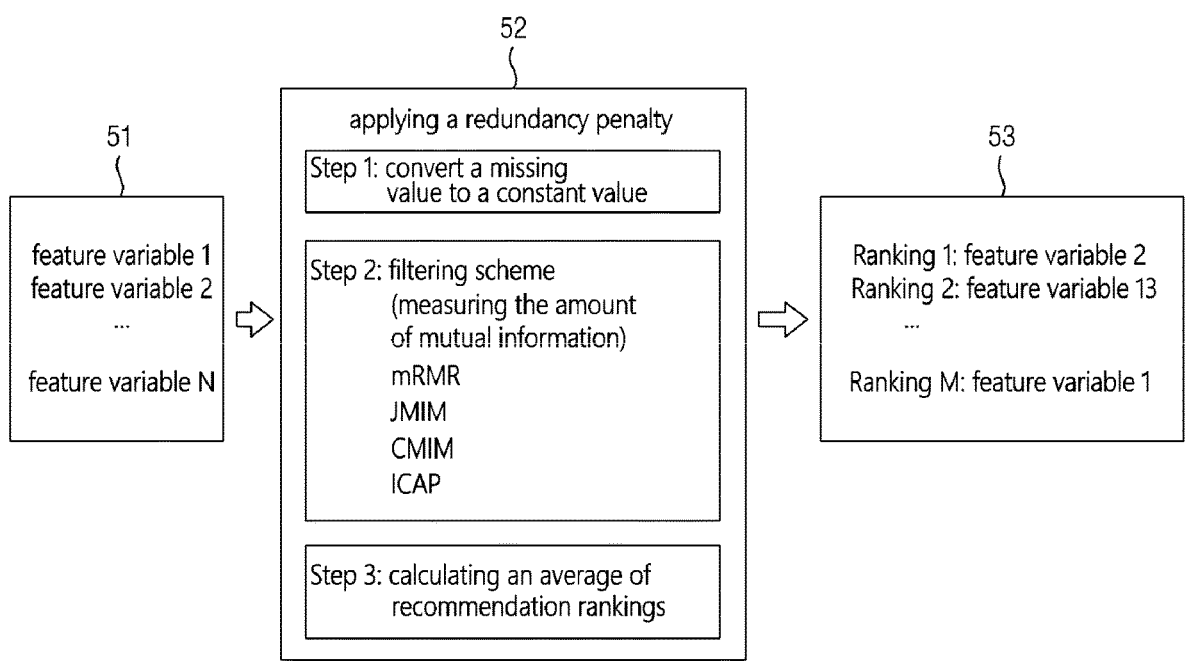
FIG. 5 is an example of applying a redundancy penalty in the method for recommending the feature described with reference to FIG. 3.

FIG. 5 is an example of applying a redundancy penalty in the method for recommending the feature described with reference to FIG. 3. FIG. 5 corresponds to operations S31 to S33 of FIG. 3 and shows an example of a result of recommending a feature variable provided by the application of the redundancy penalty.

In the illustrated example, in order to apply the redundancy penalty, all N feature variables 51 except for a target variable from a target data set for analysis are used as input data.

In a process 52 of applying the redundancy penalty, step 1 is a step corresponding to operation S31 in which an operation of filling missing values for each of the N feature variables 51 with constant values is performed. As a result, it is possible to increase the redundancy between features having many missing values, thereby increasing the probability of being subsequently filtered.

Step 2 of process 52 is a step corresponding to operation S32, in which for the N feature variables 51, a method for filtering a feature variable with high redundancy is applied using algorithms such as mRMR, JMIM, CMIM, or ICAP, which may measure the amount of mutual information.

Step 3 is a step corresponding to operation S33, in which a recommendation ranking for each feature variable may be given using an average of recommendation rankings for each algorithm obtained in step 2.

Accordingly, the top M feature candidates 53 having a high recommendation ranking among the N feature variables 51 may be selected and provided as output data by the process 52 of applying the redundancy penalty.

Figure 6:
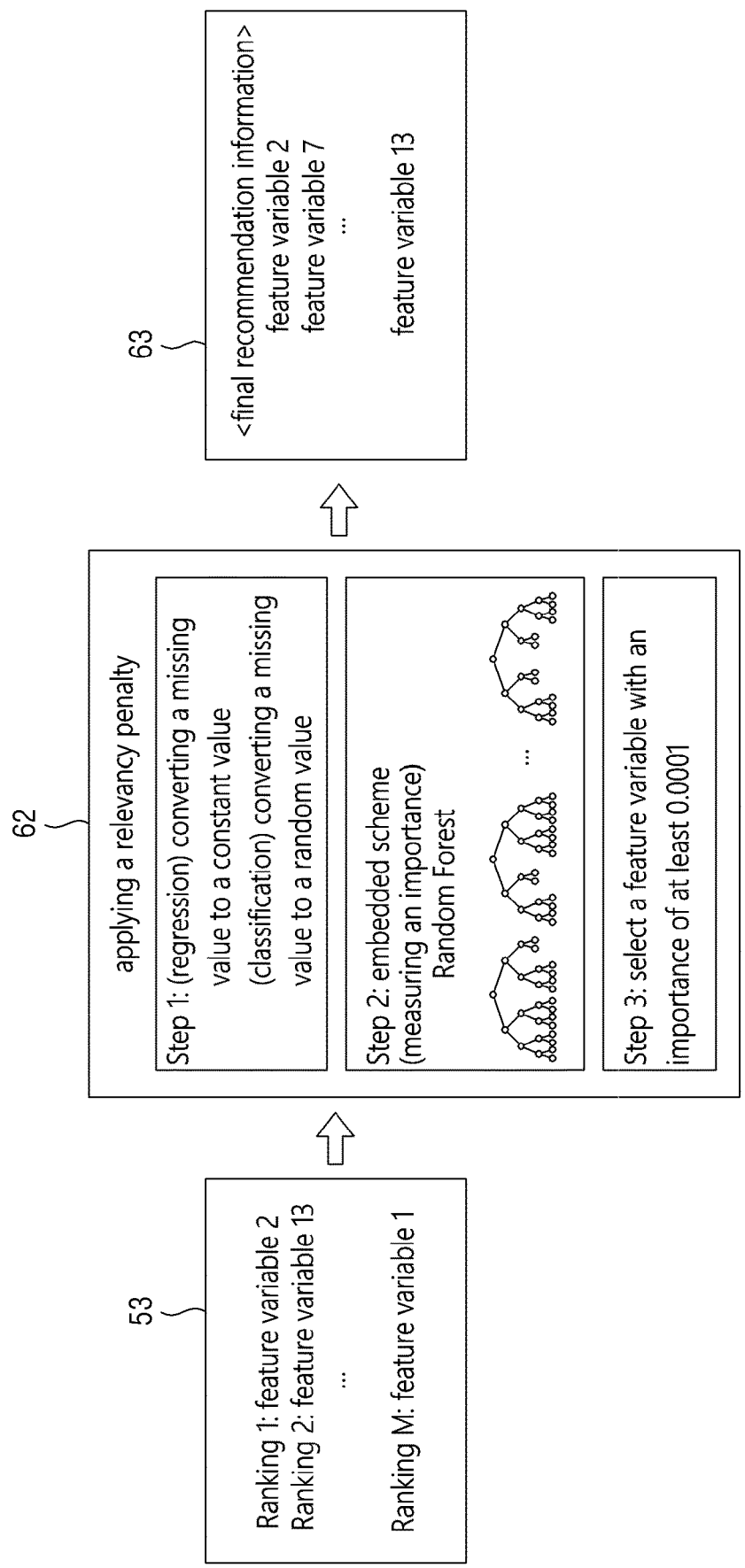
FIG. 6 is an example of applying a relevancy penalty in the method for recommending the feature described with reference to FIG. 4.

FIG. 6 is an example of applying a relevancy penalty in the method for recommending the feature described with reference to FIG. 4. FIG. 6 corresponds to operations S34 to S36 of FIG. 4 and shows an example of the final recommendation result of the feature variable provided by the application of the relevancy penalty.

In the illustrated example, in order to apply the relevancy penalty, the top M feature candidates 53 having the high recommendation ranking selected through the process 52 of applying the redundancy penalty of FIG. 5 are used as input data.

In a process 62 of applying the relevancy penalty, step 1 is a step corresponding to the second conversion of operation S34, in which an operation of filling a missing value for each of the M feature candidates 53 with a constant value in the case of a regression problem and filling with a random value in the case of a classification problem is performed. As a result, the relationship between features having many missing values and a target variable may be reduced, and the likelihood that it is selected as a final recommended feature may be reduced.

Step 2 is a step corresponding to operation S35, in which, for example, a machine learning algorithm such as random forest may be used as an embedded scheme for extracting the feature variables with a high importance in relation to classification or prediction of the target variable among the M feature candidates 53.

As an embodiment, in selecting the feature variables for applying the random forest algorithm, predetermined selection criteria may be used. As an example, among the M feature candidates 53 selected through the application of the redundancy penalty, when M is less than 25, the random forest algorithm may be applied to all M feature candidates 53. In addition, when M is greater than 25, the random forest algorithm may be applied to the top K feature variables among the M feature candidates 53 by setting a larger value among 25 and 0.25*M as K.

Step 3 is a step corresponding to operation S36, in which a feature variable having an importance value of, for example, 0.0001 or more, obtained through the embedded scheme such as the random forest in step 2, may be selected and provided as the final feature candidate 63.

FIG. 7 shows an example of data having a missing values according to some embodiments of the present invention. The illustrated table is an example of a data set to which a method for recommending a feature according to an embodiment of the present invention may be applied.

In the illustrated example, a data set includes one target variable and a plurality of feature variables (Var1, Var2, Var3, Var4, Var5, Var6, Var7, Var8, . . . ). In the illustrated data set, it may be seen that most of the plurality of feature variables have missing values indicated by 'null.'

As an example, the target variable may have a form of a continuous variable with a continuous value, and each of the plurality of feature variables may have a form of a continuous variable, a binary variable having a value of 0 or 1, or a categorical variable such as a multiclass variable divided into a plurality of values.

FIG. 8 is an example of a result of feature recommendation for the data of FIG. 7 having the missing values according to some embodiments of the present invention. The illustrated table is an example of feature variables provided as final recommendation information by a method for recommending a feature according to an embodiment of the present invention.

As an embodiment, a redundancy penalty for filling missing values with constant values may be applied to each of the plurality of feature variables that have missing values from the data set of FIG. 7, and a predetermined number of feature variables having a high recommendation ranking may be selected as a candidate by executing at least one algorithm for filtering variables having high redundancy.

Also, a relevancy penalty for filling each missing value with a constant or a random value may be applied for the predetermined number of feature variables selected, and a random forest algorithm may be executed to extract variables that are highly related to a target variable. Accordingly, a specific variable having a high importance may be selected as a final recommendation candidate from a result of executing the random forest.

In the table shown, the top 10 feature variables whose importance value is greater than 0.0001 measured from the result of executing the random forest may be selected as a final recommended feature and are illustrated in FIG. 8 as being shaded.

As described above, according to an embodiment of the present invention, feature recommendation information that is not sensitive to a result of correcting a missing value may be provided by applying a redundancy penalty and a relevancy penalty to a feature having a missing value.

Figure 9:
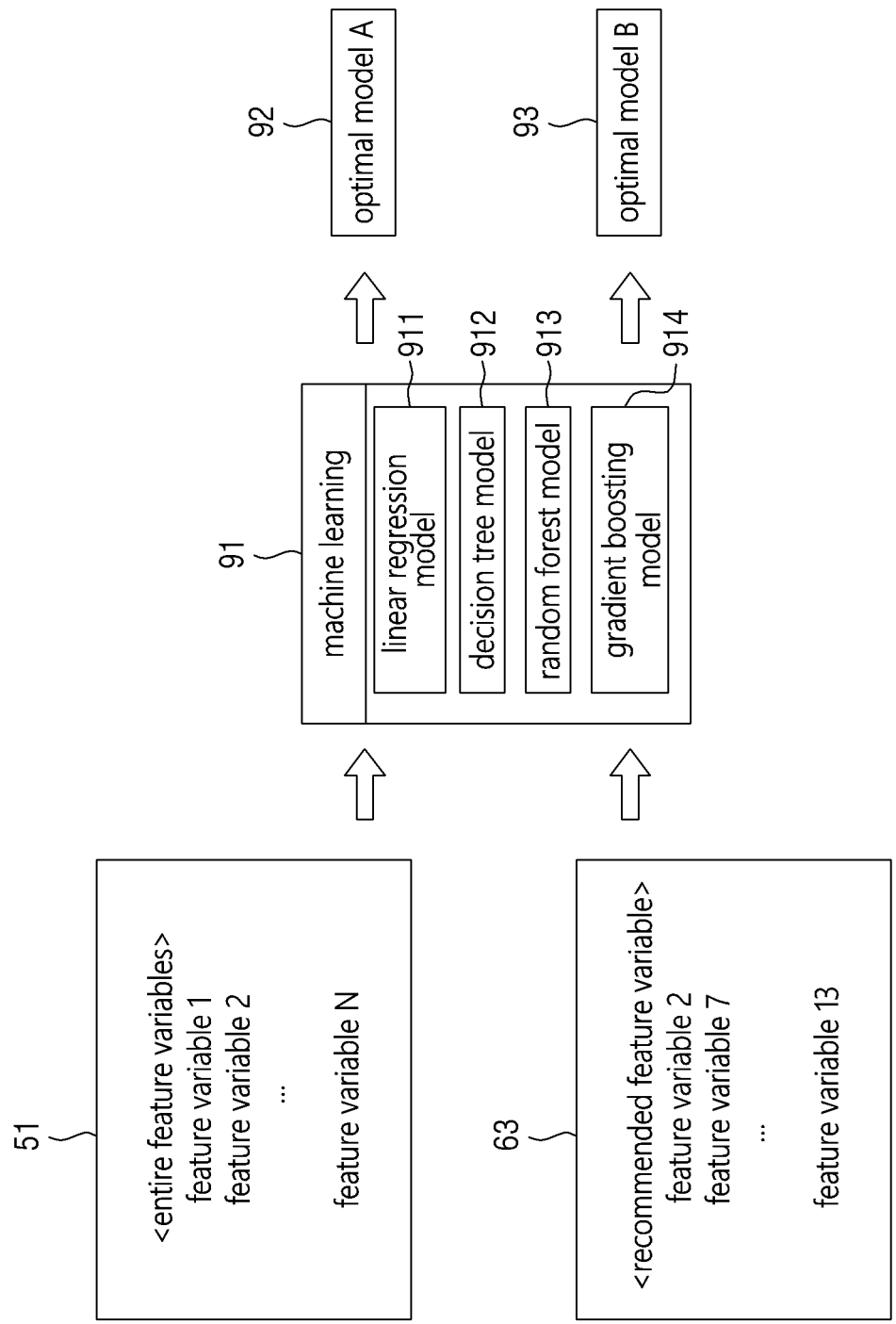

FIGS. 9 and 10 are examples of verifying the result of feature recommendation according to some embodiments of the present invention. FIGS. 9 and 10 are examples of additional operations for verifying feature variables included in the final recommendation information in the method for recommending the feature described with reference to FIGS. 3 and 4.

As illustrated in FIG. 9, an operation of verifying whether the finally selected feature variables are an optimal combination to describe the target variable may be additionally performed.

As an example, first, a fit verification based on a machine learning algorithm 91 may be independently performed for each of the plurality of feature variables 51 and the feature variables 63 included in the final recommendation information. Here, the machine learning algorithm 91 used is not limited to any one model, but may be implemented using various types of models such as a linear regression model 911, a decision tree model 912, a random forest model 913, a gradient boosting model 914, or the like.

As an embodiment, each model may be executed using a combination of all parameters used in each model in order to perform fit verification based on a plurality of machine learning algorithms. For example, in the case of the linear regression model 911, the model may be executed for 36 combinations using parameters such as elastic net and regularization. In the case of the decision tree model 912, the model may be executed for 5 combinations using parameters such as max depth. Similarly, in the case of the random forest model 913, the model may be executed for 15 combinations using parameters such as number of trees and max depth. In addition, the gradient boosting model 914 may execute the model for 9 combinations using parameters such as max iteration and max depth.

Through the execution process of each model as described above, it is possible to find an optimal model and parameters for the model based on a validation error of each model. As an example, an optimal model A 92 may be provided as a result of fit verification of the entirety of the plurality of feature variables 51, and an optimal model B 93 may be provided as the result of fit verification of the feature variables 63 included in the final recommendation information.

Referring to FIG. 10, for each of the optimal model A 92 for the entirety of the plurality of feature variables 51 and the optimal model B 93 for only the feature variables 63 included in the final recommendation information, test data may be used to execute the model, from which test errors may be obtained.

As an example, indicators such as mean squared error (MSE), root mean squared error (RMSE), mean absolute error (MAE), $R^2$, etc. may be provided as the test error obtained from each model executed using the test data. Here, the mean squared error (MSE) means a mean squared difference between a predicted value and an actual value, the root mean squared error (RMSE) means a square root of the MSE, the mean absolute error (MAE) means an average difference between the predicted value and the actual value, and the $R^2$ means a proportion of a portion that may be explained by a corresponding model among the amount of variation of a target variable.

In evaluating the model using a measurement value of the test error, in the case of the MSE, RMSE, and MAE, the closer the value is to 0, the better the model is fitted. In addition, in the case of the $R^2$, the closer the value is to 1, the better the model is fitted.

As an example, comparing measurement values of a test error 1010 for the optimal model A 92 with measurements values of a test error 1020 for the optimal model B 93, it may be seen that the optimal model B 93 having a smaller value of the MSE, RMSE, and MAE and a value of $R^2$ closer to 1 is better fitted than the optimal model A 92.

Consequently, the optimal model B 93 is a model obtained from the feature variable 63 included in the final recommendation information. Therefore, it may be seen that a combination of recommended feature variables according to an embodiment of the present invention may better describe or predict a target variable as compared to a case in which all feature variables are used.

As described above, according to a method for recommending a feature according to an embodiment of the present invention, an optimum feature combination associated with a target may be extracted without removing a missing value for data having the missing value. In addition, according to an embodiment of the present invention, it is possible to provide feature recommendation information that is not sensitive to a result of correcting a missing value by applying a penalty for the missing value.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method of recommending a feature from a data set which is performed by a computing device comprising one or more hardware processors and a memory storing one or more programs to be executed by the one or more hardware processors, the method comprising:

performing a first conversion on the data set including one target variable and a plurality of feature variables by converting a missing value for each of the feature variables into a preset constant such that a redundancy level of the plurality of feature variables increases based on a number of the missing value, the target variable being a variable to be predicted using the plurality of feature variables;

executing a first algorithm to determine the redundancy level of the plurality of feature variables, using the data set converted by the first conversion;

producing first recommendation information that includes a predetermined number of feature variables selected from among the plurality of feature variables based on a result of the executing the first algorithm;

performing a second conversion to convert a missing value for each of the predetermined number of feature variables included in the first recommendation information into a predetermined constant or a random value based on a type of the target variable such that an importance level of the predetermined number of feature variables relative to the target variable decreases based on a number of the missing value;

executing a second algorithm to measure the importance level of the predetermined number of feature variables with respect to the target variable using the data set converted by the second conversion; and producing second recommendation information that includes one or more feature variables selected from among the predetermined number of feature variables based on a result of the executing the second algorithm, wherein the performing of the second conversion comprises converting the missing value for each of the predetermined number of feature variables into the predetermined constant in case that the type of the target variable is a continuous variable and converting the missing value for each of the predetermined number of feature variables into the random value in case that the type of the target variable is a categorical variable, and wherein the first algorithm is an algorithm capable of measuring the amount of mutual information of the plurality of feature variables, and the second algorithm is machine learning-based algorithm capable of measuring relevancy with the target variable for the predetermined number of feature variables through learning the dataset converted by the second conversion.

2. The method of claim 1, wherein the first algorithm is selected from the group consisting of minimum redundancy-maximum relevancy criterion (mRMR), joint mutual information maximization criterion (JMIM), conditional mutual information maximization (CMIM), and interactive cluster analysis procedure (ICAP) capable of measuring the amount of mutual information of the plurality of feature variables.

3. The method of claim 1, wherein the producing of the first recommendation information comprises:
generating a recommendation ranking for each of the feature variables by using an average of each recommendation ranking obtained by the executing the first algorithm; and
selecting the predetermined number of feature variables based on the recommendation ranking.

4. The method of claim 1, wherein the executing of the second algorithm comprises executing a random forest algorithm capable of measuring relevancy with the target variable for the predetermined number of feature variables.

5. The method of claim 1, wherein the executing of the second algorithm comprises executing the second algorithm using only a part of the predetermined number of feature variables based on the recommendation ranking given to each of the predetermined number of feature variables.

6. The method of claim 1, wherein the producing of the second recommendation information comprises selecting the one or more feature variables whose importance level of each of the feature variables measured by executing the second algorithm is greater than a preset threshold for the second recommendation information.

7. The method of claim 1, further comprising:
performing first fit verification based on at least one machine learning algorithm using all of the plurality of feature variables;
performing second fit verification based on the at least one machine learning algorithm using only the one or more feature variables provided in the second recommendation information; and
verifying the second recommendation information by comparing results of the first fit verification with results of the second fit verification.

8. An apparatus to recommend a feature from a data set, comprising:
at least one processor;
a communication interface to communicate with an external device;
a storage to store a computer program; and
a memory to load the computer program that is executed by the at least one processor,
wherein the computer program comprises instructions executed by the at least one processor to cause the at least one processor to:
perform a first conversion on the data set including one target variable and a plurality of feature variables by converting a missing value for each of the feature variables into a preset constant, the target variable being a variable to be predicted using the plurality of feature variables;
execute a first algorithm to determine the redundancy level of the plurality of feature variables using the data set converted by the first conversion such that a redundancy level of the plurality of feature variables increases based on a number of the missing value;
produce first recommendation information that includes a predetermined number of feature variables selected from among the plurality of feature variables based on a result of the executing of the first algorithm;
perform a second conversion to convert a missing value for each of the predetermined number of feature variables of the first recommendation information into a predetermined constant or a random value based on a type of the target variable such that an importance level of the predetermined number of feature variables relative to the target variable decreases based on a number of the missing value;
execute a second algorithm to measure the importance level of the predetermined number of feature variables with respect to the target variable, using the data set converted by the second conversion; and
produce second recommendation information that includes one or more feature variables selected from among the predetermined number of feature variables based on a result of the execute the second algorithm,
wherein the performing of the second conversion comprises converting the missing value for each of the predetermined number of feature variables into the predetermined constant in case that the type of the target variable is a continuous variable and converting the missing value for each of the predetermined number of feature variables into the random value in case that the type of the target variable is a categorical variable, and
wherein the first algorithm is an algorithm capable of measuring the amount of mutual information of the plurality of feature variables, and the second algorithm is machine learning-based algorithm capable of measuring relevancy with the target variable for the predetermined number of feature variables through learning the dataset converted by the second conversion.

9. The apparatus of claim 8, wherein the first algorithm is selected from the group consisting of minimum redundancy-maximum relevancy criterion (mRMR), joint mutual information maximization criterion (JMIM), conditional mutual information maximization (CMIM), and interactive cluster analysis procedure (ICAP) capable of measuring the amount of mutual information of the plurality of feature variables.

10. The apparatus of claim 8, wherein the producing of the first recommendation information comprises:
producing a recommendation ranking for each of the feature variables by using an average of each recommendation ranking obtained by executing the first algorithm; and
selecting the predetermined number of feature variables based on the recommendation ranking.

11. The apparatus of claim 8, wherein the executing of the second algorithm comprises executing a random forest algorithm capable of measuring relevancy with the target variable for the predetermined number of feature variables.

12. The apparatus of claim 8, wherein the executing of the second algorithm comprises executing the second algorithm using only a part of the predetermined number of feature variables based on a recommendation ranking given to each of the predetermined number of feature variables.

13. The apparatus of claim 8, wherein the producing of the second recommendation information comprises selecting the one or more feature variable whose importance level of each of the feature variables measured by executing the second algorithm is greater than a preset threshold for the second recommendation information.

14. The apparatus of claim 8, wherein the computer program further comprises instructions executed by the at least one processor to cause the at least one processor to:
   perform first fit verification based on a plurality of machine learning algorithm using all of the plurality of feature variables;
   perform second fit verification based on the plurality of machine learning algorithms using only the one or more feature variables provided by the second recommendation information; and
   verify the second recommendation information by comparing results of the first fit verification to results of the second fit verification,
   wherein the results of the first fit verification include a plurality of test errors for the plurality of machine learning algorithms, and
   wherein the performing the first fit verification comprises:
   calculating a plurality of validation errors by executing a first machine learning algorithm among the plurality of machine learning algorithms while changing a value of a parameter used in the first machine learning algorithm, the parameter being a settable parameter that affects execution results of the first machine learning algorithm;
   determining a setting value of the first parameter based on the plurality of validation errors; and
   calculating a first test error included in a plurality of test errors by executing the first machine learning algorithm using the setting value.

* * * * *